United States Patent Office 3,356,670
Patented Dec. 5, 1967

3,356,670
POLYOLEFIN TREATMENT
Bernard Rudner, Gulf Breeze, Fla., and George S. Achorn, Pittsburgh, Pa., assignors to Koppers Company, Inc., a corporation of Delaware
No Drawing. Original application Nov. 13, 1961, Ser. No. 152,065, now Patent No. 3,278,498, dated Oct. 11, 1966. Divided and this application Apr. 27, 1966, Ser. No. 545,577
5 Claims. (Cl. 260—94.9)

This is a division of application Serial No. 152,065 filed Nov. 13, 1961, now Patent 3,278,498.

This invention relates to a new method of preparing polymers derived from alpha-olefins and to the novel products prepared thereby. In one specific aspect, it relates to the addition of simple inorganic molecules to growing polymers. In another specific aspect, it relates to a simplified work-up procedure for preparing polymers of reduced ash-forming impurity content.

Polymerizations of ethylene and other alpha-olefins using coordination catalyst systems to produce industrially important products are well known. Such catalyst systems are mixtures consisting essentially of (1) organometallic compounds wherein the metal is selected from Groups IA, IIA, or IIIA of the Periodic Table and (2) halides, alkoxides, or alkoxyhalides of a transition metal selected from Groups IVB, VB, VIB or VIIB of the Periodic Table. Typical examples of such systems are: (a) triethylaluminum combined with titanium tetrabromide and (b) diisobutylaluminum chloride combined with titanium trichloride. Although other known catalyst systems of this type, for instance, butyl lithium or phenylmagnesium chloride combined with vanadyl chloride or tetrabutyl titanate, may yield polymers of slightly different properties, they involve the same general mechanism and are therefore considered equivalent for the purpose of this invention.

The first step of the mechanism, the initiation of polymer chains, is generally believed to involve conversion of the monomer, such as propylene, to a highly active species having at least one carbon to metal bond. The second step involves incorporating additional propylene molecules between the carbon and the metal atoms, so that chain propagation occurs outward from the metal atoms of the catalyst. If, during the process of chain growth, propylene monomer, dimer, trimer, etc., are all consumed without being replenished, chain growth will cease, but polymerization will not necessarily be terminated. As long as active catalyst remains, either in the form of the original components, or some useful products they might generate, initiation of new chains and growth in older ones will occur on supplying fresh monomer, without adding catalyst, under the original conditions of polymerization. By the terms "living" polymer and "active" polymer, we include not only polymers in the state of chain growth, but also polymers whose growth is dormant because of lack of monomer, particularly those in which the capacity for growth has not been destroyed by chain termination.

Some of the polymer chains may be self-terminating by breaking away from the metal as terminal olefins of high or moderate molecular weight. However, a large number of chains, depending on the type of monomer and the conditions of polymerization, remain associated with metal atoms until polymerization is intentionally terminated in the polymer "work-up" and purification. Commonly, termination is effected by reacting the polymerization mixture with an excess of alcohol, such as methanol. The reaction may be set forth in the equation:

M—CH$_2$—R + R'OH → HCH$_2$—R + M—OR' wherein M represents the metal, R is the growing polymer chain, and R' is a lower alkyl radical.

This procedure is not completely satisfactory as evidenced by the large number of improvement patents issued covering use of additives such as organic acids and chelating agents to improve the purity and, directly related, the properties of the polymers by more effectively removing th einorganic catalytic residues present. These residues, for example, aluminum and titanium halides, when not removed, reduce the thermal stability and resistivity of the polymer, and also cause inhomogeneity and discoloration.

Quite surprisingly, we have discovered that the reactions of certain simple inorganic compounds of phosphorus with the growing polymers prepared from alpha-olefins in the presence of a coordination metal catalyst system lead to novel macromolecules of high purity. Polymers produced by our novel reaction show a considerable decrease in ash-forming impurities and inorganic catalytic residues.

Heretofore, terminating polymerization of alpha-olefins has been achieved by drowning the living polymer in a hydroxylic medium such as methanol. Unfortunately, this method does not permit very rapid termination because: (1) methanol does not "wet" the polymer readily and thus cannot immediately displace the solvent molecules surrounding the carbon-metal bonds; (2) methanolysis of a methanol-insoluble compound is a relatively slow reaction; (3) mixing polymerization suspension with an excess of methanol precipitates the polymer as agglomerates in which many of the carbon-metal bonds are inaccessible to methanol; and (4) methanol cannot convert many insoluble residues, e.g., those containing carbon to divalent or trivalent titanium bonds, to soluble or otherwise removable titanates.

However, the simple inorganic molecules used in our invention are largely hydrocarbon solvent-soluble, and instantly reactive with carbon-metal bonds without causing agglomeration. As an example, phosphorus pentachloride quickly converts carbon-titanium bonds to carbon-phosphorus bonds and, at the same time, converts titanium dichloride formed during polymerization to soluble titanium tetrachloride. Thus it also promotes removal of the inorganic constituents of the polymerization system to give a purer, more stable, color-free polymer useful for electrical insulation.

Our novel termination reaction converts up to half of the polymer chains after hydrolysis into macromolecular acids. The single terminal functional groups permit a simplified determination of the polymer structure. Some of these terminal groups also give increased printability and increased thermal stability.

It is, therefore, an object of our invention to prepare new polymers containing reactive groups in the terminal position from alpha-olefins.

It is a further object to provide a new method for terminating polymerization of aplha-olefins by adding to the living polymers simple inorganic substances.

It is another object to make polymer containing reduced ash-forming impurities from alpha-olefins.

It is another object to provide improved control of polymerization by analysis of the chain terminating agents to measure the length of the polymer chain.

In accordance with the invention we have discovered a new method for terminating the coordination metal catalyzed polymerization of an alpha-olefin containing from two to nine carbon atoms by reacting the growing polymer with at least one compound selected from the group consisting of the oxides, oxyhalides, and halides of phosphorus. We have further discovered that this termination reaction can be made to yield novel polymers in which a single functional group containing a phosphorus atom is attached to the terminal carbon atom of up to 50% of the polymer chains.

Our invention is applicable to polymerization of single or mixed alpha-olefins containing from 2–9 carbon atoms. These include, but are not limited to: ethylene, allene, propylene, butadiene, isoprene, piperylene, cyclopentadiene, hexatriene, styrene, isopropenylbenzene and indene. Although functionally substituted olefins such as vinyl chloride, vinyl ethers and esters, acrylates and their derivatives may be polymerized by coordination catalysts, and the living polymers reacted with the simple inorganic compounds used in our invention, such reactions tend to modify, sometimes undesirably, the functional groups.

The simple inorganic compounds we have found useful as terminating agents are the oxides, oxyhalides and halides of phosphorus.

The halides useful for our invention are chlorides, bromides and iodides. Some fluorides, e.g., phosphorus trifluoride, are useful for our invention. With regard to the remaining halides, chlorides are preferred as being more effective, more stable, and less expensive than the bromides or iodides.

The oxides, oxyhalides, and halides are equally effective in terminating polymerizations; however, they differ in other properties produced. Reactions of each group of simple inorganic compounds with the growing polymer is illustrated by the equations shown below.

The phosporus acid groups introduced by termination with phosphorus trichloride give more resistance to thermal embrittlement and oxidation, but less affinity for useful bases, than do the phosphonic acid groups introduced by termination with phosphorus pentoxide, pentachloride or oxychloride. Phosphorus pentoxide is the most useful when a halide-free polymer of high purity is needed, e.g., for electrical insulation. The pentachloride is the most effective reagent for reducing the amount of inorganic ash-forming impurities. Almost as effective is phosphorus oxychloride which is a liquid and consequently easier to handle. Some equations illustrating the terminating reactions of phosphorus compounds are:

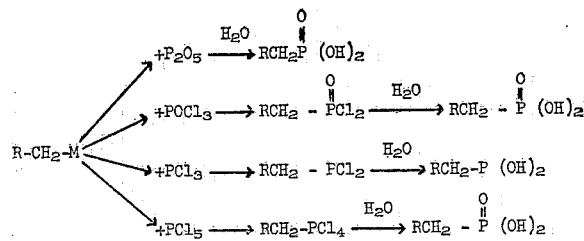

wherein M represents the metal and R is the growing polymer chain.

Desirable effects may also be obtained by reacting with the living polymer two or more of the simple inorganic compounds set forth in our invention in sequence or simultaneously.

The novel termination reactions are preferably carried out by adding, after a predetermined duration of polymerization, the simple terminator molecules to the active polymerization with vigorous agitation. It is necessary to use at least one equivalent of terminator for each equivalent of catalyst. Using more than one hundred equivalents of terminator per equivalent of catalyst is undesirably wasteful. As an example, polymerization of propylene in n-heptane by a mixture of one m-mole of butyl lithium and one m-mole of titanium tribromide, giving a total of 4 milli-equivalents, could advantageously be terminated by no less than ⅘ of a m-mole of phosphorus pentachloride.

The temperature at which the terminators may be added is not critical, and they may be added at the temperature of polymerization. Preferably, the reactions are best carried out at or above room temperature within a range of 20° C. to 150° C.

The termination reaction is preferably carried out at atmospheric pressure, but the range of about one to ten atmospheres is operable. No advantage is gained by working under reduced pressure.

When the termination reaction is completed, the reaction mass is mixed with approximately an equal volume of a hydroxylic solvent, such as a lower alkanol or water, which may contain small quantities of dispersants or other additives. Our novel process makes practical drowning in water alone, rather than expensive alcohols. For the first time, it also makes possible drowning in aqueous bases, avoiding the corrosion problems of the prior systems. Filtration then gives the desired novel polymer.

The invention is further illustrated by the following examples:

EXAMPLE I

A two-liter dye resin pot was purged with nitrogen and charged under air-free conditions with 680 g. of pure, dry heptane, 0.009 mole of titanium tetrachloride and 0.0099 mole diethylaluminum chloride (abbreviated DEAC), and the mixture stirred for one hour at room temperature to age the catalyst. Ethylene was fed into the catalytic mixture for one hour at a rate slightly greater than its rate of absorption, allowing the temperature of the stirred mixture to rise spontaneously from 23° to 48° C. Approximately half the polymer slurry was then transferred, under nitrogen pressure, into a second air-free flask and treated with 1.64 ml. (0.019 mole) phosphorus trichloride while continuously stirring for 32 minutes at ambient temperatures. Polymerization was deliberately stopped at 13 g. polymer/g. titanium tetrachloride whereby large amounts of unaltered catalyst were retained. Methanol was added to both the control and the treated polymer and each was separately filtered, restirring twice with 250 ml. of methanol plus 100 ml. of distilled water for ½ hour, and dried under vacuum at 60° C. overnight. The phosphorus trichloride-treated polymer had a viscosity average molecular weight of 65,500 (compared to the control of 63,600), and contained 0.24% phosphorus as phosphonous acid groups at the chain terminals. Calculations based on this data showed that approximately 48% of the polymer chains are terminated by phosphonous acid groups at one end. Results confirm that the treated polymer was purer than the control as shown by (a) sharper infrared curves, (b) higher carbon and hydrogen content by elemental analysis: treated polymer 85.2% carbon and 14.2% hydrogen; control: 84.8% carbon and 13.7% hydrogen; and (c) a reduction in ash content of 16.5%. Note that ash content comes from the ignition of polymers containing aluminum and titanium residues. Films prepared from the phosphorus trichloride-treated polymer and the control polymer were about the same color, but the control contained more specks.

EXAMPLE II

The procedure of Example I was repeated and half the polymer slurry was treated with 0.019 mole phosphorus oxychloride with polymerization deliberately stopped at 5.5 g. polymer/g. titanium tetrachloride to give maximum ratio catalyst weight to polymer weight. Analysis of the polymers showed the treated polymer: 85.2% carbon, 14.5% hydrogen and 0.33% phosphorus as terminal phosphonic acid groups; and control: 84.2% carbon, 13.9% hydrogen and no phosphorus. The treated polymer had 21.4% less ash content than control and gave much clearer, lighter film while both polymers had approximately the same molecular weight.

EXAMPLE III

The procedure of Example I was repeated up to a yield of 14 g. polymer/g. titanium tetrachloride. Half the polymer slurry was treated with 3.95 g. (0.019 mole) phosphorus pentachloride repeating the work-up previously described. Comparison of the polymers showed the treated polymre: molecular weight 65,500, carbon content 85.5%, hydrogen content 14.3%, phosphorus 0.2%, and giving a clearer white film. The control polymer: molecular weight of 65,000, carbon content 84.9%, hydrogen content 14.2%, no phosphorus, and produced a dirty tan film. There was an ash content reduction of 57.2% in the treated polymer and, in addition, the titanium content was reduced from 494 p.p.m. to 86 p.p.m., giving an 86.3% reduction.

EXAMPLE IV

To a suspension of 1.25 ml. DEAC and 1.0 ml. $TiCl_4$ in 492 ml. pure purged cyclohexane, first aged ½ hour at 60° C. was added, at 20° C. for 28 minutes with continuous agitation, 158 g. styrene. After adding, the polymer was stirred at 45° C. for 30 minutes and divided into two portions. Half was introduced into a mixture of 41.$H_2O$,7 g. Nacconol NRSF and a few drops HCl to reduce pH to 2. The other half was treated with 3.95 g. $PCl_5$, stirred two hours at 65° C. and drowned under the same conditions as the control. Both were washed and filtered till no longer foaming and dried to const. weight. Control contained 1.2% ash, $PCl_5$ treated containing 0.8%, a 33% reduction.

EXAMPLE V

The procedure of Example IV was repeated using 407 g. n-heptane and aging the catalyst at 60° C. While constantly stirring, 102 g. styrene was gradually added for a period of 30 minutes at a temperature of 12–14° C. The polymer was divided into two portions and half treated with 2.34 g. $PCl_5$ at 20–35° C. for two hours. Both portions were drowned in water containing 1 g. Nacconol NRSF and at a pH of 2. A comparison of the polymers showed: control: 1.6% ash; $PCl_5$: treated 0.5%, giving a 68.8% reduction in ash content.

EXAMPLE VI

Polymer prepared as in Example I was split into two roughly equal portions and the living control drowned in methanol. The rest was stirred first with 0.02 mole phosphorus tribromide for ½ hour at 57–54° C., then for 80 minutes at 54–51° C. with 0.04 mole phosphorus trichloride. It was drowned in water containing enough acid to bring the pH to about 2 and a small amount of a dispersant. This portion of the polymer, when filtered and dried, contained 12.7% ash and 2.2% phosphorus (largely inorganic). When the freshly filtered, undried polymer is extracted with aqueous hydrochloric acid at 60–70° C., the ash content drops to that of the alcohol-washed control (0.6%) and the clear, colorless film obtained from the dried product contains anti-oxidant phosphonous acid groups at the chain terminals.

EXAMPLE VII

The procedure of Example VI was repeated and the polymer divided into two parts. The control portion was drowned in methanol. The rest was treated first with 0.02 mole phosphorus trichloride at 65° C. for ½ hour, followed by 0.04 m. phosphorus pentachloride at 65° C. for ½ hour, and then drowned, like the control, in methanol. The treated portion showed considerable reduction in ash content.

We claim:

1. A process for making polymers of improved properties comprising the steps of (1) polymerizing alpha-olefins containing 2–9 carbon atoms initiated by a coordination metal catalyst system consisting essentially of organometallic compounds wherein the metal is selected from the Group IA, IIA, IIIA, of the Periodic Table and a member selected from the group consisting of halides, alkoxides, and alkoxy halides of a transition metal selected from Group IVB, VB, VIB and VIIB of the Periodic Table, and (2) terminating the reaction by reacting the carbon metal bonds on the terminal ends of the living polymers with an inorganic compound selected from the group consisting of the oxides, oxychlorides, and chlorides of phosphorus wherein the amount of said compound is at least one equivalent for each equivalent of said catalyst used.

2. A process for making polymers of improved properties comprising the steps of (1) polymerizing alpha-olefins containing 2–9 carbon atoms initiated by a coordination metal catalyst system consisting essentially of organometallic compounds wherein the metal is selected from the Group IA, IIA, IIIA, of the Periodic Table and a member selected from the group consisting of the halides, alkoxides and alkoxy halides of a transition metal selected from Group IVB, VB, VIB and VIIB of the Periodic Table, and (2) terminating the reaction by reacting the carbon metal bonds on the terminal ends of the living polymers with an inorganic compound selected from the group consisting of the oxides, oxychlorides, and chloride of phosphorous, then (3) treating the product with a hydroxylic solvent selected from the group consisting of lower alkanols and water, and (4) filtering the mixture to obtain said polymer.

3. A process according to claim 2 wherein the inorganic compound is phosphorus trichloride.

4. A process according to claim 2 wherein the inorganic compounds are phosporus trichloride and phosphorus pentachloride.

5. The process of claim 2 wherein the inorganic compound is phosphorus pentachloride.

References Cited

UNITED STATES PATENTS 3,008,939   11/1961   Schroeder _____ 260—94.9

FOREIGN PATENTS

36/15,287   8/1961   Japan.

JOSEPH L. SCHOFER, *Primary Examiner.*

L. EDELMAN, *Assistant Examiner.*